United States Patent [19]
Albrecht

[11] 3,830,591

[45] Aug. 20, 1974

[54] ILLUMINATION APPARATUS

[75] Inventor: Richard Edmund Albrecht, Rochester, N.Y.

[73] Assignee: Eastman Kodak Company, Rochester, N.Y.

[22] Filed: May 4, 1973

[21] Appl. No.: 357,293

[52] U.S. Cl. .............................................. 355/71
[51] Int. Cl. ........................................ G03b 27/76
[58] Field of Search ......... 355/67, 71; 350/266, 272

[56] References Cited
UNITED STATES PATENTS

| | | | |
|---|---|---|---|
| 3,205,767 | 9/1965 | Weber et al. | 95/10 CD |
| 3,312,143 | 4/1967 | Karow et al. | 355/71 X |
| 3,592,544 | 7/1971 | Brendel | 355/70 |
| 3,594,081 | 7/1971 | Tschink | 355/67 |
| 3,669,538 | 6/1973 | Fowler | 355/67 |
| 3,746,429 | 7/1973 | Spindel et al. | 350/266 |

Primary Examiner—Samuel S. Matthews
Assistant Examiner—Alan Mathews
Attorney, Agent, or Firm—R. L. Owens

[57] ABSTRACT

For use in a document reproducing apparatus such as a planetary microfilmer, apparatus is disclosed which compensates for $Cos^4\theta$ light intensity fall-off of an illuminated document as projected by an objective lens to thereby produce a uniform exposure of an image of the document to be photographed. The apparatus includes a source of illumination, a light reflecting surface for reflecting light from the source off a document to be photographed to vary the intensity of illumination of the document in a first direction along the document to compensate for $Cos^4\theta$ fall-off in such first direction, and a plurality of spaced light blocking bars disposed relative to the light source to vary the intensity of illumination of the document in a second direction along the document to compensate for $Cos^4\theta$ fall-off in such second direction.

2 Claims, 6 Drawing Figures

ILLUMINATION APPARATUS

BACKGROUND OF THE INVENTION

1. Field Of The Invention

This invention relates to document reproducing apparatus and more particularly to apparatus for controlling the illumination of an object or area from a source of illumination to compensate for $\cos^4\theta$ light intensity fall-off.

2. Description Of The Prior Art

In the photographing of documents in microfilmers or the like, it is desirable to have the microfilmer relatively compact in design. This compactness facilitates installation, improves portability of the apparatus, and may contribute to a reduction in cost. However, because of the size of such apparatus, the light source is disposed relatively close to the document and this creates problems. As is well known in the art, it is desirable that the light source is located at a sufficient distance from the optical axis of the lens system to avoid specular reflection problems.

Another important consideration in microfilmers, however, is that the light reflected off a document to be photographed causes a uniform film exposure at the film plane. Since the intensity of illumination of the film plane varies inversely as the distance of the light source, the film plane will not be illuminated uniformly by light reflected from the document when the light source is located off-axis. In order to facilitate a uniform illumination of the film plane, various apparatus have been utilized which vary the profile of the intensity of illumination of the document to be photographed to compensate for off-axis illumination and/or the $\cos^4\theta$ fall-off of the lens. In one approach to compensate for this "fall-off," a special filter is aligned with the objective lens and has a radial optical gradient selected to reduce on-axis and near-axis light intensity to match off-axis light intensity. In another approach, apparatus are provided with a number of independently controlled light sources to vary such profile. Such an approach has a number of difficulties including the need for frequent adjustment of the intensity of such light sources. More particularly, often each lamp is generally dedicated to illuminating a portion of the copyboard and loss of a single lamp results in an unacceptable illumination profile. Further, since the illumination from each lamp overlaps areas covered by other lamps, initial set-up for total copyboard illumination uniformly is difficult. Such a configuration also results in a considerable sensitivity from lamp-to-lamp, particularly when a new replacement lamp is placed into a group of aged lamps.

SUMMARY OF THE INVENTION

It is therefore an object of the present invention to provide an improved illumination apparatus for microfilmers which compensate for the foregoing intensity variation problem (viz., $\cos^4\theta$ fall-off) and which obviates the need for frequent adjustment.

Another object of the invention is to provide an improved and relatively compact illumination apparatus having a self-contained source of illumination and which is capable of providing photographic copies substantially free of spectral reflection and non-uniform exposure problems.

Another object of the invention is to provide apparatus which is able to control the illumination from an artificial source of an illuminated object.

Another object of the present invention is to provide apparatus for use in photographic copying apparatus to vary the intensity of illumination on predetermined areas of a document to be photographed to compensate for $\cos^4\theta$ fall-off.

Yet another object of the present invention is to provide apparatus for use in combination with a document copying apparatus to obtain uniform film exposure of a document for photographic purposes.

In the disclosed illumination apparatus, there is provided means defining an area for receiving a document, a source of illumination for illuminating such area, a plurality of reflecting surfaces disposed between the source and the area to reflect light from the source onto the area in a first direction along the document to compensate for $\cos^4\theta$ fall-off and a plurality of spaced light blocking bars disposed relative to the source to vary the intensity of illumination of light from the source at the area along a second direction to compensate for $\cos^4\theta$ fall-off along such second direction.

Another feature of the invention is that if one of the lamps in the light source should burn out or age faster than the remaining lamps, the average intensity of illumination of the copyboard will be reduced but the compensation factors for $\cos^4\theta$ fall-off will be hardly affected.

BRIEF DESCRIPTION OF THE DRAWINGS

FIGS. 2a and 2b are combined by superposition;

DESCRIPTION OF THE PREFERRED EMBODIMENT

Figure 1:
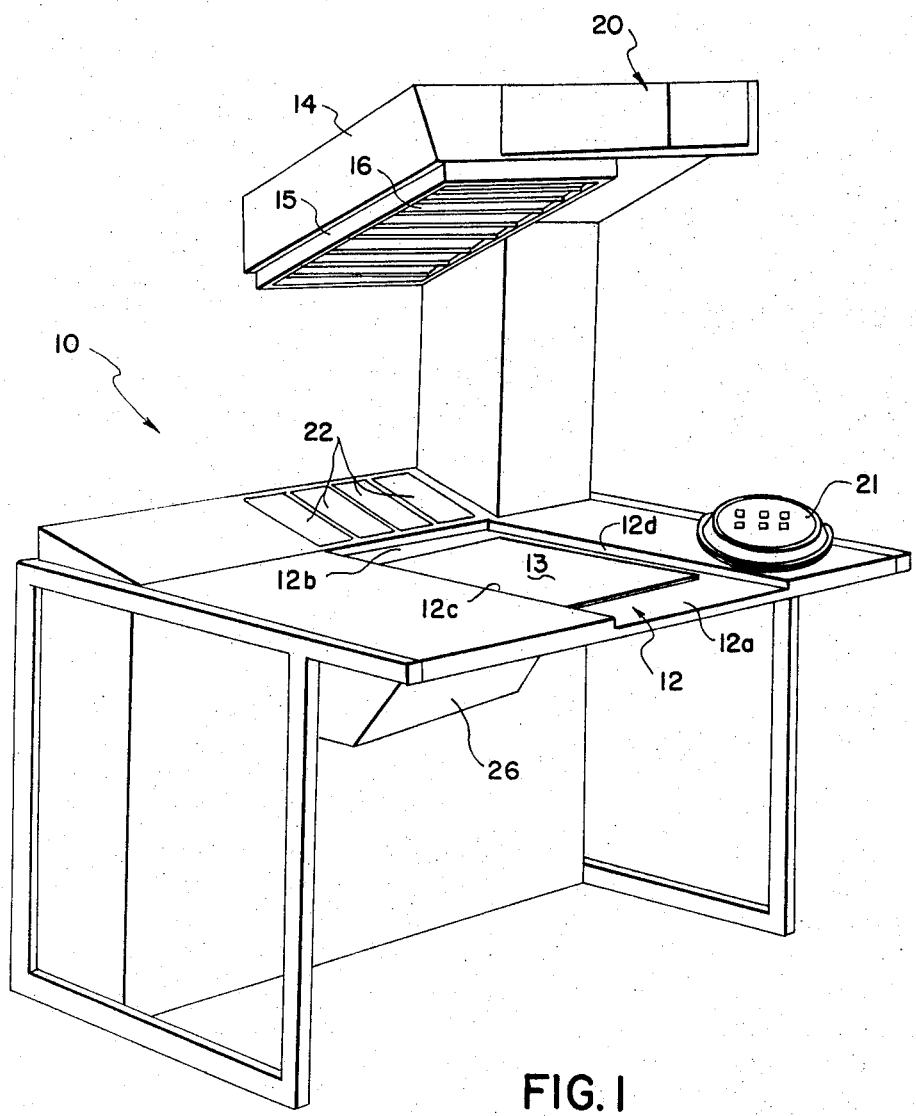
FIG. 1 is a perspective view of the exterior of a planetary microfilmer showing portions of the illumination apparatus in accordance with the invention.

For a general understanding of planetary microfilmer apparatus wherein the present invention has particular utility, reference is made to FIG. 1 wherein the exterior of a planetary microfilmer 10 is shown. Such microfilmers are well known in the art, as will be described, and operate to photograph an image of a document when disposed on a copyboard 12. For future reference throughout the specification, the front and rear of the copyboard are labeled 12a and 12b respectively and the two sides of the copyboard are labeled 12c and 12d respectively.

The general operation of the planetary microfilmer 10 as shown in FIG. 1 will only be briefly described. In operation, an operator takes a document 13 and places same on the copyboard 12. A housing 14 contains a panel 15 carrying a plurality of strips 16 having reflective surfaces respectively and a photographic station 20 (see FIG. 4). When information is to be added onto the film adjacent the image of the photographed document 13, then a keyboard 21 is operated by depressing appropriate ones of the switches on the keyboard; finally a switch on the keyboard 21 is despressed which causes the energization of a series of illumination lamps 26 (see FIG. 4) disposed beneath transparent paneling 22. Light from the lamps 26 is projected through the transparent paneling and illuminates the relective strips 16 which then project the light downward onto the document disposed at the copyboard 12. In accordance with the invention, the illumination lamps 26 are located lower than the copyboard 12 and out of sight of the operator below paneling 22 thereby eliminating heat which can cause operator discomfort. Further, as will be described in connection with FIG. 4, the location of the panel 15 and the lamps shields an operator from the direct light that could result in glare annoyance or in secondary reflection from the operator's clothing which could cause unwanted illumination "hot spots" in a developed film image.

Figure 2A:
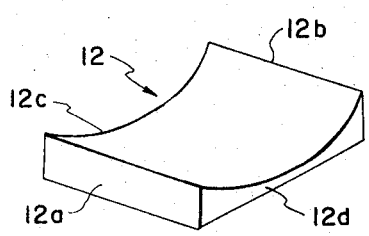
FIGS. 2a and 2b show intensity respectively caused by the reflecting strips shown in FIGS. 1 and 4 and the light blocking or attenuator bars shown in FIG. 5.
Figure 2B:
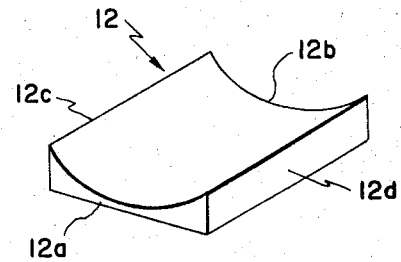
Figure 3:
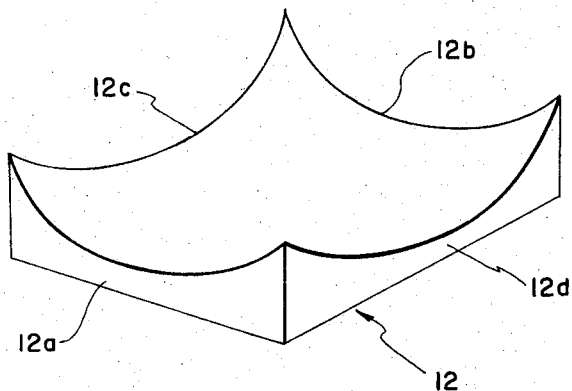
FIG. 3 shows the composite intensity of illumination profile of both when
Figure 4:
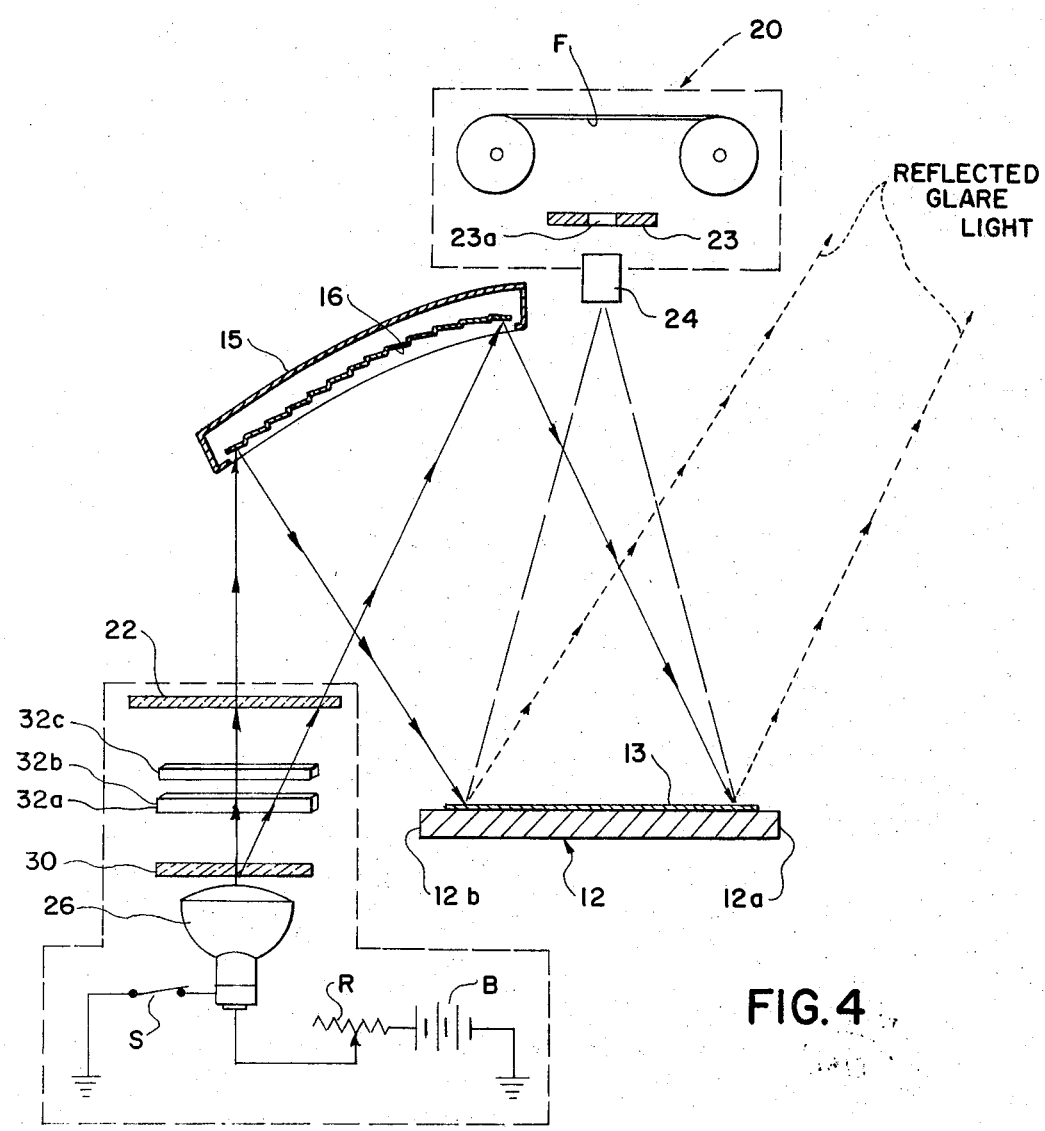
FIG. 4 shows a schematic partially in cross-section of a representation of the position of the plurality of reflective surfaces as shown in FIG. 1.

As shown in FIG. 4, the illumination light source 26 is located off-axis from the microfilmer or camera lens 24. In accordance with the invention, it is desired to vary the light intensity at the copyboard in accordance with the inverse of $Cos^4\theta$. The angle $\theta$ which is the argument of $Cos^4\theta$ refers to the angle of a light ray as it impinges upon the lens 24 from the copyboard 12. This approach is illustrated in FIGS. 2a and 2b. In FIG. 2a, the required intensity of illumination profile from front to back (12a–12b) relative to the copyboard is the result of correctly locating by experiment the reflective surface of the strip 16 mounted on the panel 15. FIG. 2b shows the intensity profile caused by the attenuator bars shown in FIG. 4. In actual operation, the intensity profile represented by FIGS. 2a and 2b are, of course, superimposed on each other. FIG. 3 shows such superposition and depicts that the intensity of illumination increases radially from the center of the copyboard according to the inverse of $Cos^4\theta$.

The photographic station 20 also includes a conventional microfilmer, a shutter 23 defining an exposure aperture 23a through which light passes from the objective lens 24 to the film F, from the bank of illumination lamps shown for the sake of convenience as a single illumination lamp 26. The lamp 26 is serially connected through an adjustable resistor R to a battery V. By varying the resistance parameter of the resistor R, the intensity of illumination of the lamp 26 may be adjusted. Also shown adjacent the light source 26 is a conventional glass diffuser 30 and a series of attenuator bars 32 (see FIG. 5 which will be discussed in detail later).

Due to the fact that the reflective panel 15 is off-axis with respect to the optical axis of the imaging lens, correction for the off-axis $Cos^4\theta$ phenomenon must be accomplished by correctly locating each of the particular reflective strips to provide the necessary compensation for different angles of incidence and distance for the various light paths. Instead of a plurality of strips 16, a continuous member having a curved reflective surface could be provided. In certain instances this may provide cost advantages in that the curved surface could be provided by a flexible reflective sheet. However, this approach does not provide the same degree of design freedom as does a plurality of individually reflective strips. More particularly, the plurality of reflector strips 16 permits the angle of incidence for the given area to be adjusted to be greater than the off-axis angle of the lens and therefore prevents glare reflections from reaching the lens.

Blending of the beams from each reflective strip into an acceptable uniform pattern becomes an important concern, and there are several factors which must receive attention. The surface quality of the individual strips should be the same so that there is little difference in reflective efficiency. The shape of the surface, be it curved or flat, should not have discontinuities or have large deviations. For example, a sheared edge on a metallic reflective strip causes blending problems. Twisting and bowing of the reflective strip should also be avoided. Careful attention must be given to the alignment of the optical centerlines of the reflectors with respect to neighboring reflectors because serious misalignment causes bright and dark bands to appear on the copyboard. The tolerance on alignment is dependent upon the geometry of the illumination apparatus and the size and number of reflective strips all of which can be determined experimentally. A large number of narrow reflective strips may be easier to blend than a small number of wide reflectors, although for any given configuration there is a point where it is impractical from a production standpoint to increase the number and decrease the size of the reflectors.

Figure 5:
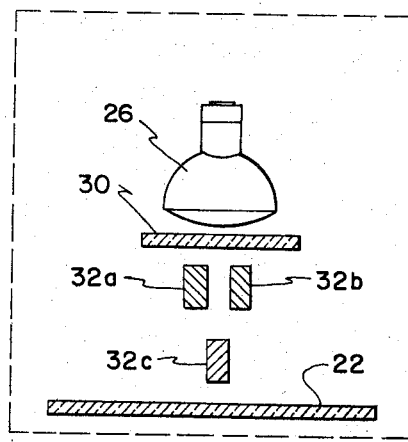
FIG. 5 shows the position of the attenuator or light blocking bars relative to light source and the bottom portion of this Figure shows how such bars are viewed from various positions along the copyboard which is shown in cross-section.
Figure 5:
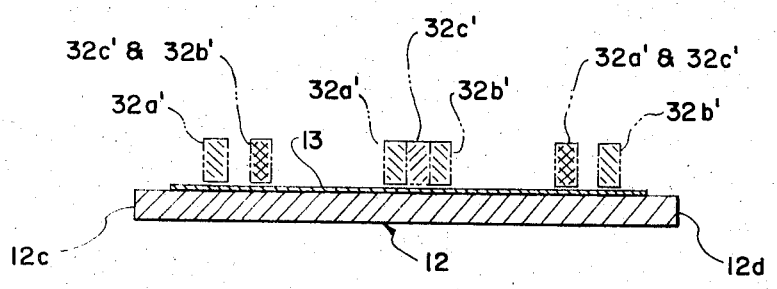

Turning now to FIG. 5 and to the side-to-side profile shown in FIG. 2b, this profile is accomplished by locating the attenuator bars 32 as in FIG. 5. There are three bars—bars 32A and B form a bar now closest the light source 26, and bar 32C now forward of the bars 32A and B. At the bottom of FIG. 5 shows the effect if one views the attenuator bars from the copyboard 12. These attenuator bars are shown in phantom lines with primes '. At the center of such copyboard, the three attenuator bars 32A', B' and C' are shown to be aligned and much of the light is blocked thereby reducing the intensity of illumination. However, as one moves to the left or to the right, a position will be reached wherein only two attenuator bars are actually seen. For example, at the left side bar 32A' is seen but only attenuator bar 32C' is seen with bar 32B' aligned behind 32C'. In such a situation, the intensity of illumination increases. Thus, by the correct location of the attenuator bars 32, the profile of FIG. 2b can be achieved.

The amount of attenuation is controlled by the width and spacing of the bars. If all the bars are equal in width and all the spaces are also equal, the intensity profile changes too fast to match the inverse $Cos^4\theta$ curve. To match the curve more closely requires that at least one of the two variables (bar width and bar spacing) be changed. A third variable is bar shape. In most cases, however, bar shape cannot be varied since it would also cause unwanted change in the front-to-back direction due to parallax. However, the parallax problem can be eliminated by placing the first row of bars (viz., 32A and B) very close to the light source. The bars on this attenuator may have any shape needed to control the copyboard profile. The second attenuator bar 32C should not change dimension along its length.

The type of light source 26 will determine what variations are needed in the bar and space patterns. If there are non-uniformities in the light source, then the symmetry of the bar pattern must be arranged in such a way that the attenuation is not altered by the non-uniformities. For example, each lamp in a multiple lamp source must have one complete pattern attenuating its light over the entire width of the copyboard so that any variations in one lamp will affect the entire copyboard equally. Such a constructed apparatus would not be particularly sensitive to such variables as filament placement, dark ends of fluorescent lamps, or lamp-to-lamp differences in a multiple lamp source. Variations in the average intensity of illumination of the copyboard can be adjusted by means of a conventional automatic exposure control apparatus.

As was previously noted, a diffuser 30 is disposed between the light source 26 and the attenuator bars 32. The reason for this is as follows. The reflective strips 16 mounted on the panel 15 each produce one strip of light for such reflector. These light strips must sum into a smooth profile without bright or dark bands. If the light source was specular, this would not be possible. However, by diffusing the light, the edges of the individual strips in turn become diffused and bend more easily and aid in eliminating the bright or dark bands. Further, by diffusing the source, the effects of surface discontinuities in reflector strips 16 may be minimized.

The diffuser also is of assistance when using the attenuator bars 32. The reason for this is that the two rows of bars tend to produce dark bands that lie in a front-to-back direction. By using a diffuser these bands may be substantially reduced.

The invention has been described in detail with particular reference to a preferred embodiment thereof, but it will be understood that variations and modifications can be effected within the spirit and scope of the invention.

I claim:

1. In a planetary microfilmer having a copyboard defining an area for receiving a document to be reproduced, a source of illumination disposed below said copyboard for illuminating said area and a photographic station located above said copyboard and including a lens disposed optically off-axis from said source and adapted to receive light from said source reflected off the copyboard and project same upon a film plane, the improvement comprising:

a. a plurality of light reflecting strips disposed between said source and said area to uniformly vary the intensity of the illumination of light from said source at said area along a first direction to compensate for $Cos^4\theta$ fall-off in said first direction as viewed by said lens;

b. at least one light attenuator bar disposed relative to said source between said reflecting strips and said source to uniformly vary the intensity of illumination of light from said source at said area along a second direction orthogonal to said first direction to compensate for $Cos^4\theta$ fall-off in said second direction as viewed by said lens; and c. a light diffuser disposed between said bar and said light source for diffusing light from said source.

2. The invention as set forth in claim 1 wherein there are three attenuator bars arranged in two rows with two of said bars being disposed in one of said rows.

* * * * *